No. 749,926. PATENTED JAN. 19, 1904.
J. FLIEGEL.
APPARATUS FOR HEATING LIQUIDS, ESPECIALLY MILK.
APPLICATION FILED MAR. 23, 1901.
NO MODEL. 2 SHEETS—SHEET 1.

No. 749,926. PATENTED JAN. 19, 1904.
J. FLIEGEL.
APPARATUS FOR HEATING LIQUIDS, ESPECIALLY MILK.
APPLICATION FILED MAR. 23, 1901.
NO MODEL. 2 SHEETS—SHEET 2.

No. 749,926.   Patented January 19, 1904.

UNITED STATES PATENT OFFICE.

JOSEF FLIEGEL, OF MALLMITZ, GERMANY.

APPARATUS FOR HEATING LIQUIDS, ESPECIALLY MILK.

SPECIFICATION forming part of Letters Patent No. 749,926, dated January 19, 1904.

Application filed March 23, 1901. Serial No. 52,534. (No model.)

*To all whom it may concern:*

Be it known that I, JOSEF FLIEGEL, manufacturer, a subject of the German Emperor, and a resident of Sprottauer Chaussée, Mallmitz, in the Empire of Germany, have invented a certain new and useful Improved Apparatus for Heating Liquids, Especially Milk, of which the following is a clear, full, and exact description.

This invention relates to an apparatus for heating and sterilizing or pasteurizing milk and also for heating other liquids, such apparatus being characterized by the arrangement whereby the heating-body for the liquid is provided with a chamber, in which the liquid can be left for a sufficiently-long period so as to be properly sterilized and at the same time prevented from being overheated by the heating-body. The arrangement of this central collecting-chamber is also of moment, in so far as by providing a narrow inlet-opening therein the thorough mixture of the heated liquid is insured, thereby preventing the formation of liquid layers or streams of irregular or unequal temperature. In this narrow inlet-opening may also be provided a thermometer, by which the average temperature of the heated liquid sufficiently high to secure a thorough sterilization can be ascertained with certainty.

Figure 1:
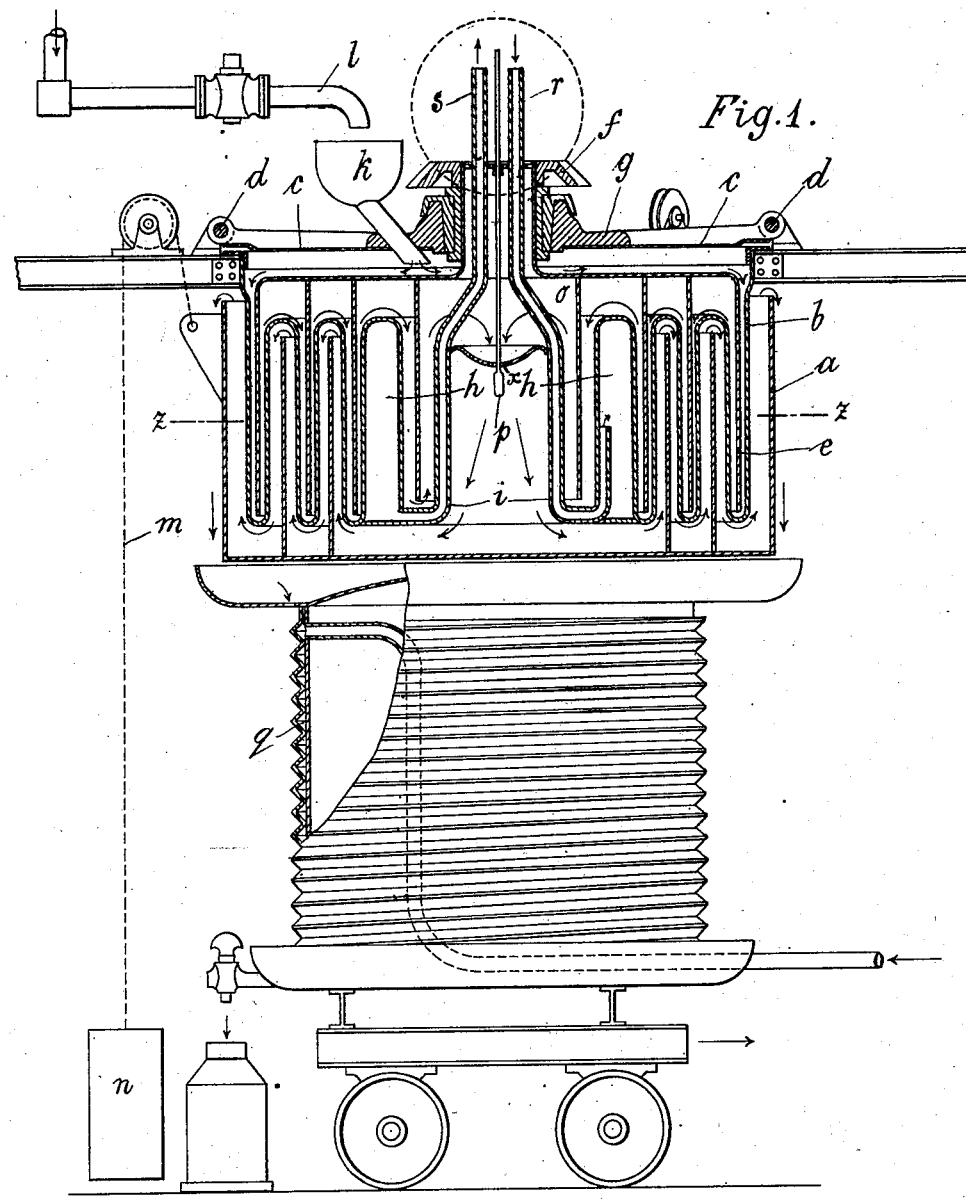
Figure 2:
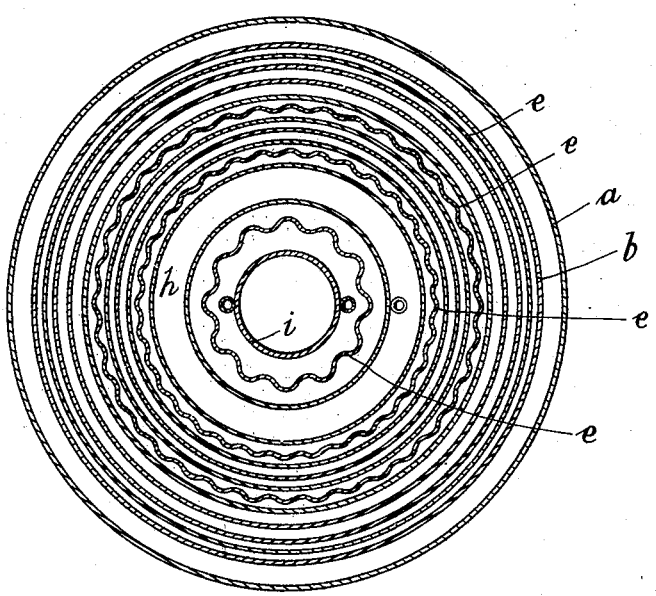

Referring to the accompanying drawings, Figure 1 shows, by way of example, a milk-heating apparatus with a portable cooler provided below the same. Fig. 2 is a horizontal section on the line $z\ z$ of Fig. 1.

The milk-heating apparatus consists of an outer cylinder $a$, held in position by the counterpoise $n$ on the rope $m$, and an inner cylinder $b$, which carries above halves of a cover $c$, pivoted to bolts $d$. In the apparatus is provided an agitator $e$, which, with a tubular extension $f$, passes through the divided hub $g$ of the cover and is set in rotation by bevel-gearing. The steam heating-body $h$, arranged within the cylinder $b$, is so connected with the steam inlet and outlet pipes $r\ s$ that both extend along the central collecting-chamber $i$, rise in the agitator $e$, and are provided outside the apparatus with manometer and cut-off valve. (Not shown in the drawings.) The cylinders $a\ b$ and the agitator $e$ interlock with their smooth or corrugated annular blades and can be easily cleaned after removing the agitator and inner cylinder.

The milk to be heated passes through the pipe $l$ and hopper $k$ onto the top of the agitator, and from thence in the direction of the arrows to the separate heating-chambers, and finally comes in contact with the heating-body $h$, filled with steam. It then enters the wide chamber $o$, from whence it passes through a comparatively narrow inlet-opening $x$ into the central collecting-chamber $i$. By forcing the milk or other liquid through the narrow inlet-opening a thorough mixture is effected and the formation of layers or streams of irregular temperature prevented. A thermometer $p$ can be inserted through the narrow inlet-opening, whereby the average temperature of the milk under treatment can be ascertained with certainty. Consequently no milk can pass out of the apparatus without coming in contact with the thermometer. The arrangement of the central chamber $i$ affords a guarantee that the heated milk passed therein is subjected to the action of this high temperature for such a length of time that an absolutely reliable sterilization is insured. A disadvantageous overheating of the milk which surrounds the heating-body cannot take place, because the latter is separated from the chamber $i$ by a wall of the agitator, which is surrounded on both sides by the liquid. The milk passes from the collecting-chamber $i$ in an opposite direction to the incoming milk into the separate chambers of the cylinders $a\ b$ and gives off its heat there in order to be finally cooled down from its highest temperature of about 102° Celsius to such an extent that it passes out at a temperature of about 25° Celsius, while the incoming milk has only a temperature of about 15° Celsius. The issuing milk flows down against the outer wall of the cylinder $a$ and passes therefrom directly to the cooler $q$, by which it is cooled down in a well-known manner to a temperature of about 8° Celsius.

Having now particularly described and ascertained the nature of the said invention, I declare that what I claim, and wish to secure by Letters Patent, is—

In an apparatus for treating and sterilizing or pasteurizing milk and also for heating other liquids, the combination with an outer cylinder $a$, an inner cylinder $b$, an agitator $e$ set in rotation by bevel-gearing, and a central collecting-chamber $i$ provided with a narrow opening through its top, around which a steam-chamber is provided, and a steam-inlet and a steam-outlet leading along the central collecting-chamber, the said narrow opening through the top of the collecting-chamber serving to mix the milk, substantially as described and set forth.

In witness whereof I have hereunto set my hand in presence of two witnesses.

JOSEF FLIEGEL.

Witnesses:
CARL DOSER,
HERMANN BARTSCH.